United States Patent [19]

Horton

[11] Patent Number: 5,156,262
[45] Date of Patent: Oct. 20, 1992

[54] CONVEYOR BELT MODULE DRIVE SURFACES FOR MATING WITH SPROCKET DRIVE SURFACE IN THE HINGING REGION

[75] Inventor: Paul L. Horton, Metairie, La.

[73] Assignee: The Laitram Corporation, New Orleans, La.

[21] Appl. No.: 756,876

[22] Filed: Sep. 9, 1991

Related U.S. Application Data

[63] Continuation-in-part of Ser. No. 610,751, Nov. 8, 1990, Pat. No. 5,083,660.

[51] Int. Cl.⁵ ............................................. B65G 23/06
[52] U.S. Cl. .................................. 198/834; 198/851; 198/853
[58] Field of Search ........................... 198/851–853, 198/834

[56] References Cited

U.S. PATENT DOCUMENTS

| | | | |
|---|---|---|---|
| 3,724,285 | 4/1973 | Lapeyre | 198/834 |
| 4,729,469 | 3/1988 | Lapeyre | 198/852 |
| 4,742,907 | 5/1988 | Palmaer | 198/852 |
| 4,832,187 | 5/1989 | Lapeyre | 198/853 |
| 4,886,158 | 12/1989 | Lapeyre | 198/853 |
| 4,949,838 | 8/1990 | Lapeyre et al. | 198/853 |
| 4,953,693 | 9/1990 | Draebel | 198/853 |
| 5,083,660 | 1/1992 | Horton | 198/853 |

FOREIGN PATENT DOCUMENTS 7613685 12/1976 Netherlands ............ 198/853

Primary Examiner—Joseph E. Valenza
Attorney, Agent, or Firm—Laurence R. Brown; James T. Cronvich

[57] ABSTRACT

This invention solves a problem encountered in driving conveyor belts where mating belt drive engagement surfaces and sprocket drive surfaces interact to cause wear and to force the belt away from the sprocket. Thus, various shaped modular belt links, provided in accordance with this invention to fit into various conveyor belt configurations, have drive structure appendages extending from cylindrical structure about the pivot rod journalling aperture to form drive surfaces which enter and leave mating sprocket drive channels, with wall surfaces formed between adjacent sprocket teeth in a substantially parallel drive relationship to avoid radially directed forces that drive the belt away from the drive sprocket. Trapezoidal shaped drive surface appendages from the links extend from a generally cylindrical body about the pivot rod in a preferred embodiment. Sprocket drive teeth engage respective ones of two side by side such cylindrical bodies on different end to end links for driving the belt in opposite directions. The cylindrical body has walls of differing thicknesses on opposite sides where intersected by a plane parallel to the belt.

25 Claims, 4 Drawing Sheets

CONVEYOR BELT MODULE DRIVE SURFACES FOR MATING WITH SPROCKET DRIVE SURFACE IN THE HINGING REGION

This is a continuation-in-part of my co-pending application 07/610,751 filed Nov. 8, 1990 now U.S. Pat. No. 5,083,660.

TECHNICAL FIELD

This invention relates to the structural characteristics of conveyor belt modules, and more particularly to interacting module and sprocket drive surfaces coacting at the hinging joints.

BACKGROUND ART

Modularized conveyor belts and accompanying drive systems are well known in the art, and are found with modules of various characteristics that are coupled together and articulated by means of pivot rods so that they can be endlessly moved by means of rotatable sprockets. The trend in the art is to produce modules of various shapes and interactions for achieving various advantages in operation. It is a general problem in the art to provide modular elements that are easily made, such as by molding from plastic, and yet present superior operating characteristics particularly in the critical sprocket and module driving surface interface. Thus, one objective of this invention is to provide improved simplified modular elements and conveyor belt drive systems embodying modular elements.

A critical operational region in conveyor belt systems driven by a sprocket at the hinged joints is caused by the hinging driving interface between the belt modules and the relatively moving rotating sprocket drive surfaces. The prior art has many different configurations of sprocket and belt structure with special driving surface features. However, the prior art hinge region drive surfaces present operational disadvantages. In consideration of the driving interface design of prior art conveyor belt systems, some of the critical operating conditions involved are the wear at interfacing drive surfaces, the ability of the belt to articulate smoothly over small diameter sprockets, the performance of the belt over the range of no-load to full-load conditions, the energy or friction losses of the drive system, the ability to run at various speeds, freedom from vibration and noise, and the ease of replacing worn surfaces or parts. In particular the interface between sprocket and module surfaces generally react during the hinging acting to urge the belt away from the sprocket to introduce significant problems in controlling belt slack and tension and wear at the sprocket-hinge interface surfaces. No known prior art belt system has been completely satisfactory over such a comprehensive range of desiderata. Thus, it is a further objective of this invention to provide improved belt drive systems advantageous with respect to these foregoing requirements, which is useful for a variety of belt module configurations.

The significant uncorrected problem that has surfaced in many of the prior art sprocket to belt drive interface systems is that the motion of the sprocket and the interaction of the drive surfaces tend to generate forces which drive the belt away from the sprocket. This visibly reacts in a manner similar to slack in the unloaded system, and if the belt is tightened to remove slack, then the operating friction becomes excessive, without correcting the urging forces, thereby causing inefficient operation with more wear on the drive surfaces. Other attempted solutions, such as counteracting forces applied to the belt or limiting guide brackets to limit belt movement away from the sprocket are not satisfactory solutions. Accordingly a still further objective of this invention is to provide an improved conveyor belt system wherein interacting belt-sprocket drive forces that tend to drive the belt away from the sprocket are avoided.

Other objects, features and advantages of the invention will become apparent from the following description taken with the accompanying drawings and claims.

DISCLOSURE OF THE INVENTION

A modularized conveyor belt is formed from variously shaped modular members, illustrated for example in a wishbone-shaped embodiment defining three fingers or link ends respectively as a stem extending in one direction and two bifurcated fingers extending in the opposite direction to define drive surfaces containing journalled apertures alignable along pivot axes at opposite ends of the modular members. The various modules for which this invention is directed have in common drive surfaces in the hinging region which move during articulation and thus produce a dynamic interface with mating sprocket drive surfaces. These modular members thus have disposed about pivot rods side-by-side interfacing drive members extending alternately in opposite directions about pivot rods toward respective end to end articulating modules. Different configurations permit links to be articulated at opposite ends about a pivot rod, or groups of such links held together in modular units of predetermined width across the belt by means of integral interconnecting structure such as connecting crossbeams, usually centrally positioned along the length of the modular elements and disposed normally to the direction of belt travel. Typically the belt loading surface of one class of modular links or modular units terminates in a plane, which could be a suitably apertured flat sheet surface, for example, or alternatively an open gridwork arrangement. Another class of modular members may have non-planar belt loading surfaces.

Spacings between adjacent parallel pivot rod axes (pitch) formed by the module member or modular sections may vary, but typically could be as little as about one-half inch (1.27 cm) for smaller modules, which need be addressed as well as larger modules. In such modules, drive tooth surfaces typically extend downward from the bottom belt surface about 0.1 inch (0.25 cm) for a 0.5 inch (1.3 cm) pitch. This invention is not pitch limited. A preferred wishbone pitch is 0.6 inch (1.5 cm). In any event, a typical drive surface afforded by this invention could comprise a generally trapezoidal drive tooth shape with planar sidewalls extending from generally cylindrical surfaces disposed about the pivot rod to form journalling apertures.

Belt systems in general are driven by a rotary sprocket wheel with peripheral teeth entering mating channels of the modular members to interface with interacting module drive surfaces. Thus, a drive force reacts on the pivot rod through generally cylindrical structure, which constitutes the pivot rod journals at opposite ends of the modular members. The entry angle of the sprocket drive teeth with respect to the two substantially parallel interacting drive surfaces of module links afforded by this invention accommodates entry into and exit from the sprocket wheel or drive contact without interference. Thus, two substantially planar surfaces are mated with substantially parallel dynamic movement for both entry and exit of sprocket driving teeth into the belt configuration. The respective planar drive surfaces are disposed generally radially with respect to the sprocket wheel drive axis for mating in movement over a predetermined sprocket arc. The module members form sprocket channels or notches for drive teeth to enter or leave the belt with the sprocket and module planar teeth surfaces substantially parallel so that radial forces tending to drive the belt away from the sprocket are avoided.

To facilitate better driving forces when the sprocket drive tooth surfaces enter the sprocket drive notch of the belt without any interference or substantial surface wear, the link end pivot rod journalling surfaces at the drive interfaces may have a different radius center than the opposite surface. Thus, the two walls formed about the pivot rod at the module link finger ends in a plane parallel to the belt have different thicknesses to produce a thinner inside edge surrounding cylindrical wall positioned inwardly in the driven link in the driving direction than the corresponding outside driven edge wall thickness directed away from the driven link ends. This avoids any interference, scrubbing or wear on the sprocket teeth from the adjacent interdigited link ends of the adjoining modular section during dynamic reaction with sprocket drive teeth at the articulation joint.

Accordingly the modular belt conveyor system drive interface between the module links and the sprocket interengage in movement onto, about and away from the rotating sprocket wheel to produce substantially only circumferentially oriented drive forces. The interface contact forces from the sprocket wheel engaging the belt to the driven link are applied in a direction substantially tangential to the sprocket wheel thereby avoiding the undesired radial forces produced in the prior art drive interfaces that tend to urge the belt or module away from the sprocket wheel. This keeps noise, friction, vibration and wear at a minimum and maintains the belt in good circumferential contact with the sprocket wheel under all conditions from no-load to full-load.

The invention will be hereinafter described in more detail with reference to the accompanying drawing.

BRIEF DESCRIPTION OF THE DRAWING

In the drawing, wherein like reference characters represent similar features throughout the several views.

THE PREFERRED EMBODIMENTS

Figure 1:
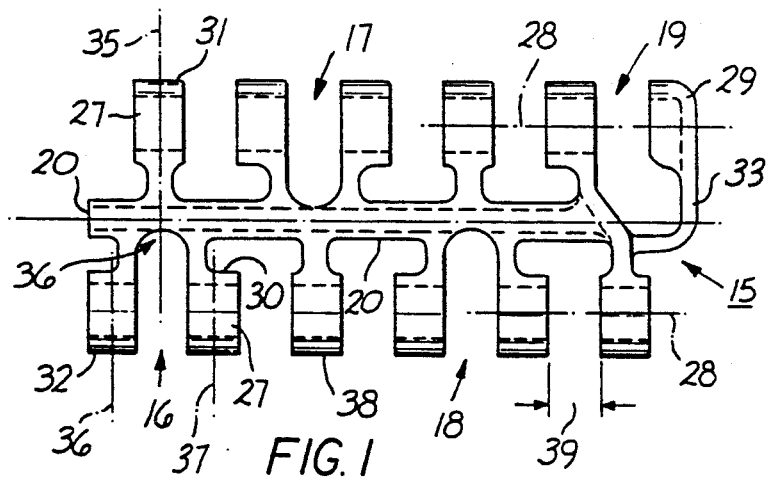
FIGS. 1 and 2 are respectively top and left end views of a wishbone styled modular conveyor belt section embodiment of this invention.
Figure 2:
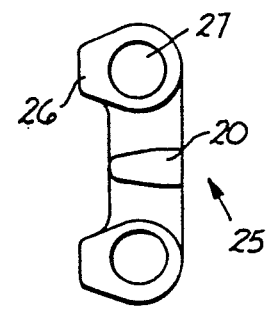

Now with reference to FIG. 1, it is seen that the belt module embodiment 15 is formed of four wishbone shaped basic modular links 16, 17, 18, 19, held in place by a substantially longitudinal transverse rod support structure 20 or connecting beam integrally joining the modular members 16, 17, 18 & 19 to provide a multi-linked modular unit. Typically the modular unit is molded from plastic and the connecting beam need not bear weight or act as a structural element such as drive member, but forms the individual links into a modular unit. As seen from the end view of FIG. 2, the top of the belt 25 forming the working surface is generally flat or planar, and drive surfaces extend from the underside as teeth 26. Axial apertures 27 formed in the module fingers 30, 31, 32 receive and journal pivot rods in fixed alignment along two parallel pivot rod receiving axes (28).

The belt edge wishbone link 19 of the module 15 forms a retaining cap 29 for preventing axial movement of the pivot rods out of the belt toward the right. The cap 29 is resiliently supported by elastic plastic arm 33 so that it may be flexed away from axis 28 to insert or remove a pivot rod along axis 28.

Each wishbone module link 16, 17, etc. has a stem portion or finger 31 with the pivot rod journalling aperture 27 having an axis (28) normal to a first plane 35 passing through the stem portion 31. The stem portion is bifurcated at the location 36 near the connecting beam 20 to extend into two branches, link ends, or fingers 32, 30, which also define pivot rod journalling apertures 27, and which lie in planes 36, 37 parallel to and on opposite sides of plane 35. These wishbone module links 16, 17 are assembled with the alternating stems 31, 38 pointing in opposite directions and with appropriate spacings 39 between the fingers of slightly greater width than the width of the fingers for interdigitating link end fingers of like modular units 15 in place in end to end relationship.

Figure 3:
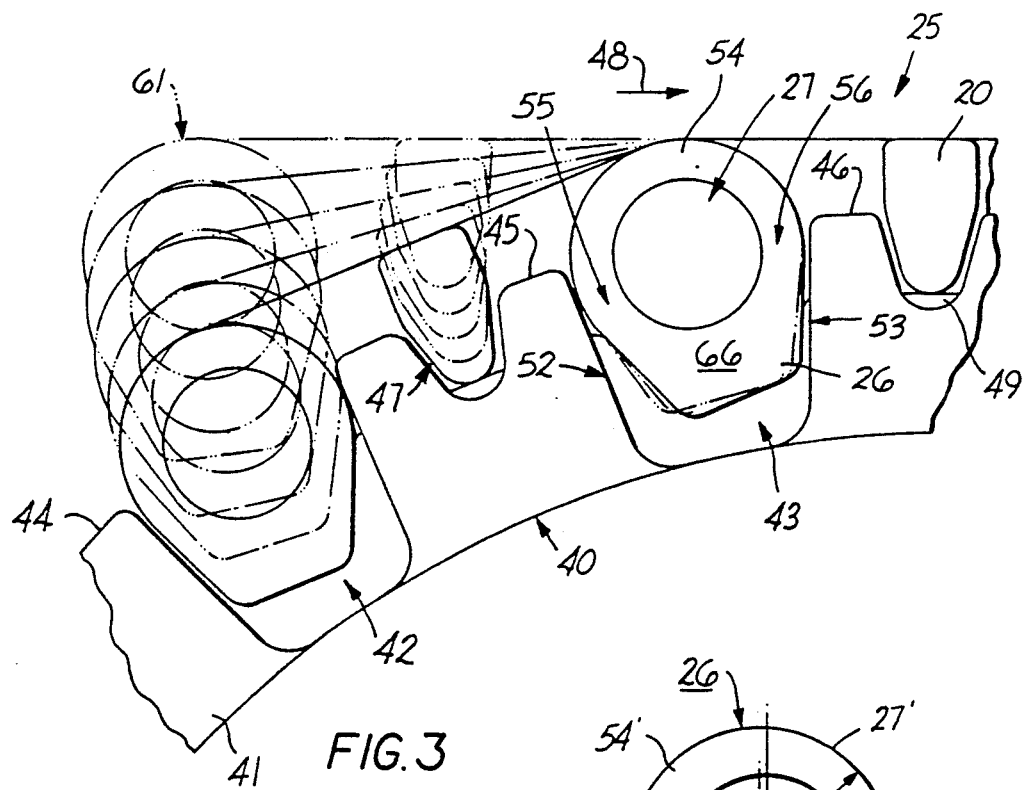
FIG. 3 is a fragmental side view of a module showing drive surface interfacing with drive sprocket tooth surfaces with analysis lines of incremental interface surface confrontations over a movement arc of the conveyor belt in which the module link tooth shaped drive member enters the mating sprocket wheel notch.

As seen from FIG. 3, a peripheral arc 40 of a rotary sprocket drive wheel 41 has a plurality of notches or spaces 42, 43 formed between adjacent teeth 44, 45, 46 about the drive sprocket periphery. Thus, looking into the left end of FIG. 1, the modular section 15 is viewed similar to the FIG. 2 profile 25 existing at a sprocket wheel engagement position somewhere along the length of the modular section 15. The belt module tooth 26 thus mates into the sprocket notch 43 and the sprocket 4 drives the belt formed of end to end modules 25, etc. in the direction of arrow 48. The access notches 49 in the teeth (46) accommodate the transverse connecting beam 20 structure of the modular units 15 in a non-contact relationship to avoid interference, as seen from the incremental movement line segments 47.

Driving surfaces 52, 53 on opposite sides of notches (43) in the sprocket wheel 41 are substantially radially disposed from the axis of rotation of the sprocket wheel 41, thereby presenting substantially planar surfaces. The sprocket teeth 44, 45, 46, etc. pass through access apertures on the bottom surface of the assembled belt end-to-end modular sections 15 in a manner later shown. Mating surfaces 55, 56 on the modular unit teeth 26 of the belt thus mate into the sprocket notches (43) between the teeth on the sprocket wheel 41 and only the surface 55 interacts as a driving surface. (The mating surfaces are not shown in touching contact in FIG. 3 to avoid clutter.)

Figure 4:
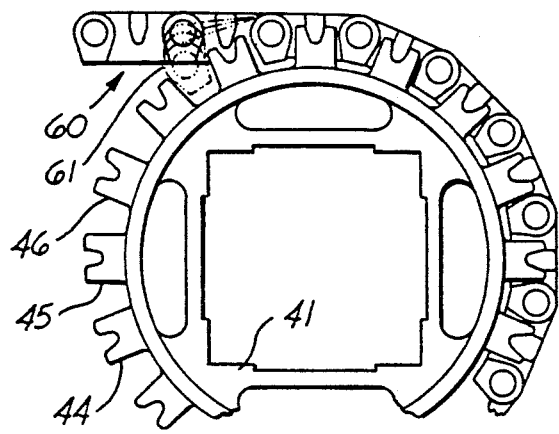
FIG. 4 is a fragmental side view of a conveyor belt system illustrating the belt to sprocket wheel interfacing improvements afforded by this invention.

The particular parallel surface structure of the interengaging drive surfaces 52, 55 herein provided assures minimal frictional losses, quiet and vibrationless entry and exit of the belt teeth 26 into the sprocket notches 43, smooth transmission of power from the sprocket drive wheel to the belt, and optimal entry and exit behavior of the belt teeth 26 with the sprocket drive notches. The drive power is thus transferred without inducing any substantial radial drive forces tending to force the belt either toward or away from the sprocket wheel periphery. Thus the belt 60 is conveyed substantially tangentially to the periphery of the sprocket wheel 41, with all drive forces urging the belt in the direction 48, as seen better from the view of FIG. 4. The belt module drive members 26 are substantially immersed in the notches 43, etc. up to, or just above, the diameter of the pivot rods and pivot rod journalling apertures 27.

The incremental postures of the belt tooth interface surfaces during the critical entry (or exit) phases as the sprocket rotation progresses over the arc 40 is represented for a set of incremental positions by the sets of position lines 61. By means of the generally trapezoidally shaped region 66 formed by the belt module drive appendages extending away from each pivot rod journalling aperture 27 and surrounding cylindrical body to form the belt drive teeth 26, the belt presents substantially planar contact interaction surfaces 55, 56. Thus, as seen in sprocket notch 42, the drive surfaces interact upon belt tooth 26 entry so that the respective belt and sprocket drive surfaces are parallel and thus avoid any driving forces tending to move the belt radially from or towards the rotation axis of the sprocket wheel 41.

Figure 3A:
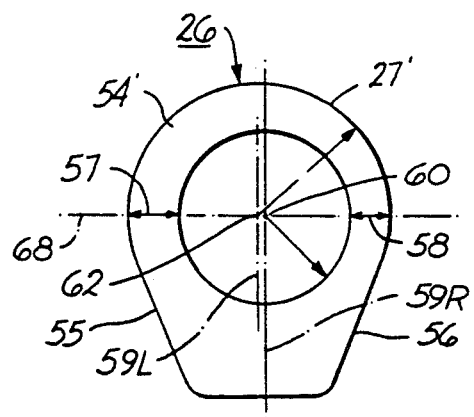
FIG. 3A shows in greater detail the critical module driven member interacting configured surfaces for reducing interference, scrubbing action or frictional contact with sprocket tooth surfaces.

As may be seen in FIG. 3A, the opposite walls 57 and 58 of the body 54 about the pivot pin journalling aperture 27' are of different thickness. Thus, the cylindrical curvature of the wall 57 by the radial arrow to provide wall 57 to the left is generated from center 60 of the cylindrical aperture 27' lying on axis 59R as noted by the radial arrow extending to wall 57. The thinner wall 58 to the right is generated similarly from offset center 62 on axis 59L as noted by the radial arrow extending to wall 58. The pivot rod journalling aperture 27' is generated from center 60 as shown by the third radial arrow. This difference in wall thicknesses reduces the tendency of the surface 56 on the belt drive tooth 26 to scrub against the mating notch (43) surface 53 of the sprocket wheel during the dynamic movement of the interengaging belt and sprocket wheel. The trapezoidally shaped tooth appendages 26 on the belt modules extend outwardly from a substantially cylindrical integral structure 54' about the pivot pin journalling aperture 27, with the contact surface 55 entering the sprocket notches 42, 43, etc. with parallel contact surfaces. Because of the thinner wall 58, the non-drive surface 56 enters and leaves the sprocket notches 42, 43, etc. without scrubbing or interference that causes wear or radial forces urging the belt modules 25, etc. away from the sprocket.

The wishbone module elements and sections 15 have a preferred pitch of the order of a 0.6 inch (1.3 cm) between the axes 28 of the pivot rods so that a belt can make very sharp turns about a sprocket of less than three inches (7.6 cm) in diameter and having sixteen sprocket teeth. Four and one-half inch (11.4 cm) diameter and six inch (15.2 cm) diameter sprockets having twenty-four or thirty-two sprocket teeth also are used where room is available for less sharp turns. Thus, the distinct advantages are attained by this invention of (1) less tendency for the belt to push away from the sprocket with corresponding advantage of simplicity in adjusting belt tension and reduced friction and energy, (2) long life because of reduced scrubbing and wear, and (3) low drive energy with very little vibration and noise caused in the drive mechanisms.

The invention is characterized by hinge driven modular conveyor belt forming links. A preferred embodiment integrally carries drive tooth surfaces extending downwardly from the belt surface from a generally hollow cylindrical link end body defining a pivot rod journalling aperture. Thus, opposite drive and non-drive surfaces are presented for interacting with mating drive surfaces of sprocket wheels at opposite sides of notches formed between drive sprocket teeth. The belt teeth are preferably shaped as trapezoidal appendages integrally extending from the generally cylindrical link end body forming a pivot rod journalling aperture. The drive tooth surfaces on the belt and the drive surfaces on the sprocket are disposed so that the belt teeth enter and leave sprocket drive channels between adjacent teeth with the opposing belt and sprocket surfaces in substantially parallel relationship to produce tangential driving forces and to avoid any radial driving forces tending to push the belt away from the sprocket.

In FIG. 3A, a characterizing feature is illustrated, namely that opposite cylindrical sidewalls 57, 58 have differing thicknesses in the plane 68 passing parallel to the belt thereby to reduce the chances of frictional contact during articulation when sprocket drive teeth engage the sidewalls.

Figure 3B:
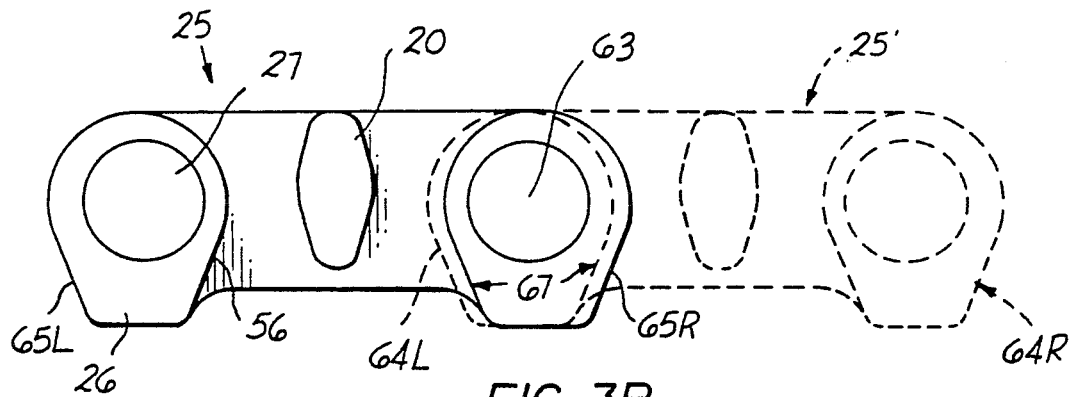
FIGS. 3B and 3C are respective end views, partly in phantom of end to end modules in unarticulated and articulated postures.
Figure 3C:
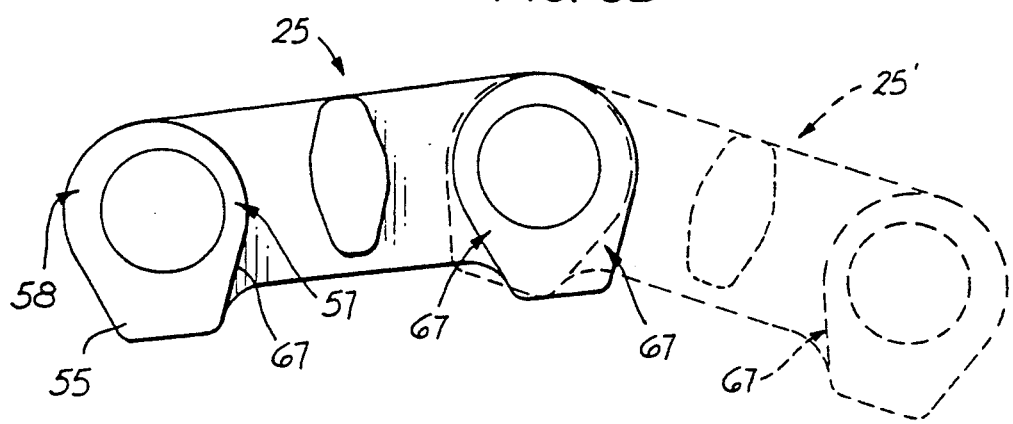

In FIGS. 3B and 3C the operational relationships of the thinner wall adjoining surface 56 and thicker wall adjoining surface 55 are illustrated. The phantom view modules 25' illustrate a pivot rod at axis 63 with respect to the modules 25, 25'. FIG. 3B shows non-articulated belt modules and FIG. 3C shows the belt modules 25, 25' articulated.

The end to end connected and interdigitized modules 25 and 25' are alternately positioned with thicker walls 58 and thinner walls 57 facing in opposite directions. Non-drive surfaces 67, by means of the thinner-thicker wall structure 58, 57 are offset from the drive surfaces (64L and 64R for module 25' and 65L, 65R for modules 25), and thus assure that no frictional contact or interference occurs from the sprocket drive teeth during the dynamic articulation cycle.

To drive the belt to the right, the drive surfaces 64L and 65L would be contacted by the sprocket drive teeth. Conversely, when driving the belt to the left, drive surfaces 65R and 64R are contacted by the sprocket teeth.

Figure 5:
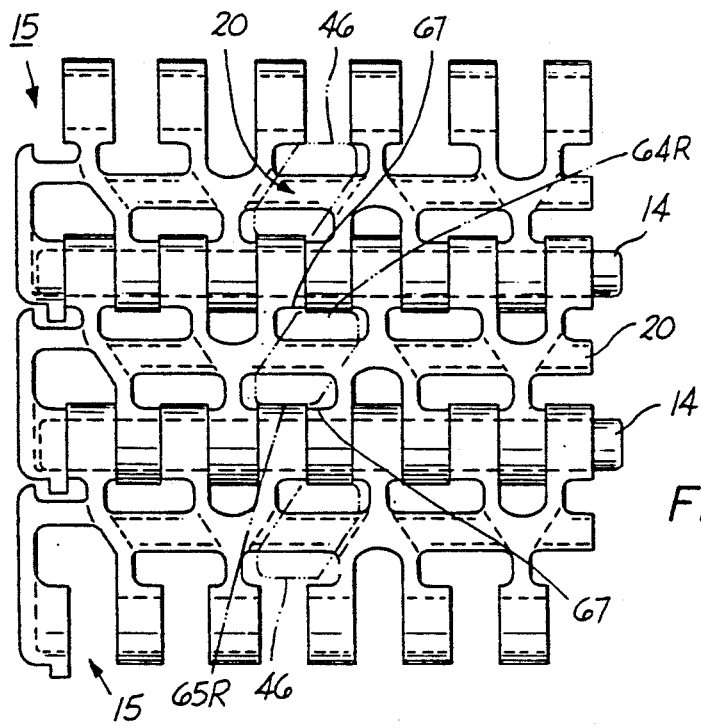
FIG. 5 is a fragmental plan view of a conveyor belt embodiment having wishbone shaped module links affixed together into modular units that are interfitted to form the belt.

As seen in FIG. 5, the modular sections 15 are held together end to end in a belt configuration by means of pivot rods 14. The sprocket drive teeth 46, which are notched to straddle the link connecting beams 20 (FIG. 3), are shown in their drive relationship so that drive forces are effected upon the pivot rod in the articulation joint region by means of the intervening wishbone member drive tooth structure described in FIGS. 3B and 3C. Thus, the non-contact surfaces 67 are distinguished from the drive surfaces 64, 65.

Figure 6:
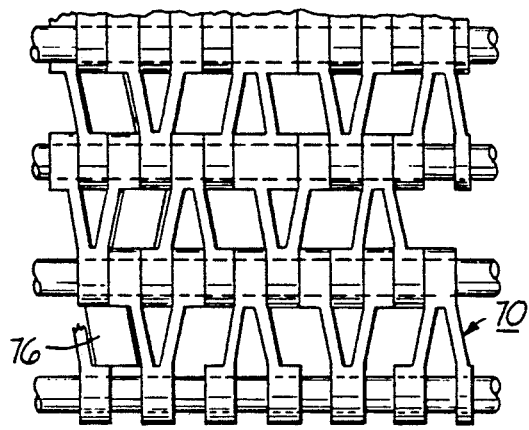
FIG. 6 is a plan view of a conveyor belt section embodiment formed from differently shaped individual V or Y shaped module links held in side-by-side position without cross members by parallel axial pivot rods at the articulation joints, thus showing alternating inter-digitated fingers from end-to-end module members disposed on the pivot rod.

The belt embodiment of FIG. 6 is formed by the individual V or Y shaped links 70 without the connecting beams employed in the previous embodiment. Although the connecting beam structure gives more unity of modular member action transverse to the belt and permits larger modular units to be made and handled, it is not a necessary feature. The offset drive and non-drive surfaces are not shown, and are not necessary for drive purposes. However they permit sprocket teeth 76 to be inserted and withdrawn for articulation with less frictional scrubbing and interference. The invention is thus generally characterized by modular link belts with drive surfaces in the hinging region for forceful contact with driving surfaces at a critical driven one of two side by side link ends.

Figure 7:
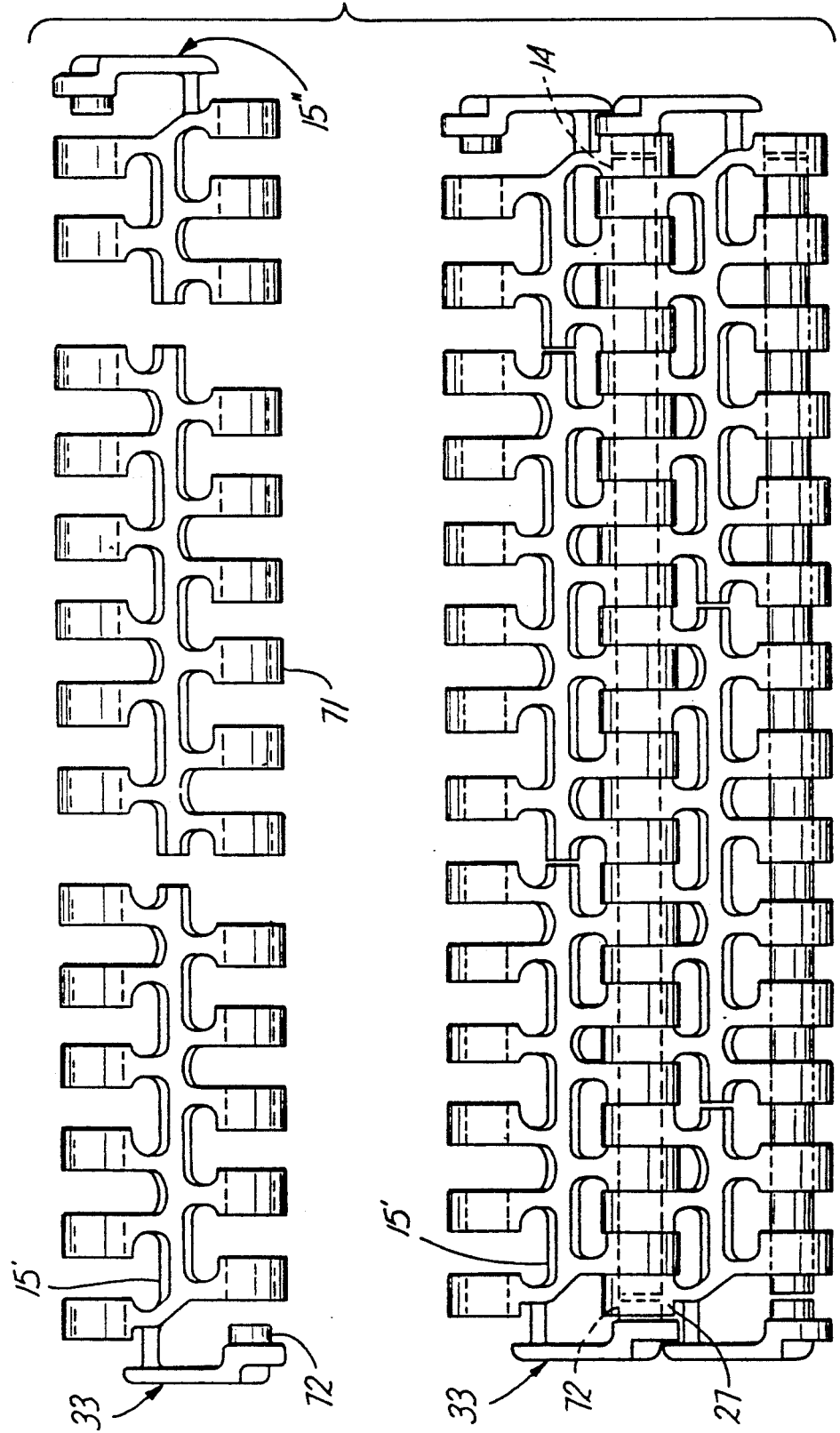
FIG. 7 is a fragmental exploded sketch of a conveyor belt embodiment illustrating how the belt configuration features of the invention are bricklayered.

From the exploded view of FIG. 7, it is seen that the modular sections may form a belt of desired width in bricklayered fashion by means of an end-cap-less modular section 71. The belt edge modular sections 15' of this embodiment have male pivot rod retention posts 72 inserted into the adjacent wishbone journalling aperture 27 to abut the pivot rod 14. As in the previous embodiment of FIGS. 1 and 5, the flexible retention ar 33 permits the retention posts 72 to be moved aside for entry or removal of the pivot rods 14.

The right end modular section 15" may be different in length from the left end modular section 15' on a row of modules. With various module lengths, the bricklaying pattern can be realized. However identical modules can be used on either belt edge with 180 degree rotation to fit on the opposite ends. The end-cap-less modules 71 also can be made of various lengths to fill the space between the endcapped belt edge units 15', 15". Thus, with only a few basic wishbone modular section configurations the belts may be bricklayered, and belts of various widths may be constructed of a minimum of only two basic modular section configurations.

Figure 8:
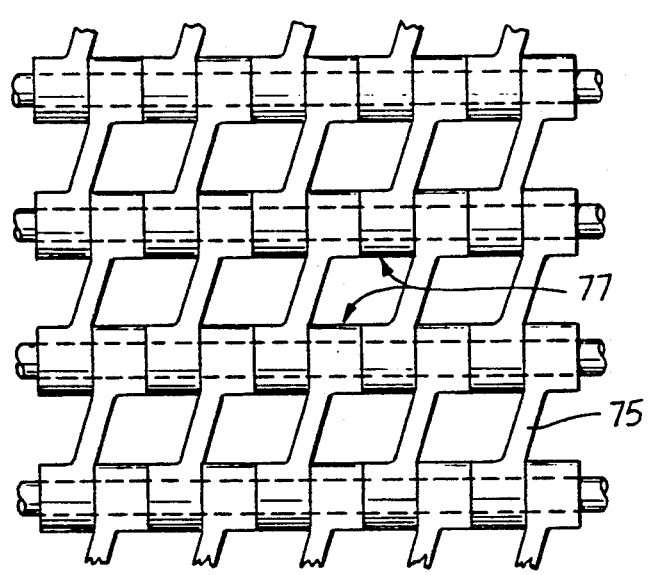
FIG. 8 illustrates a belt embodiment with offset I-shaped individual links.

In the offset I link belt of FIG. 8, the links 75 are shown individually assembled, but these may be grouped with a cross connecting beam. Such belts present drive surfaces 77 which as aforesaid are constructed for improved performance in accordance with the principles of this invention.

It has been shown that the various belt module configurations and associated drive systems afforded by this invention have advanced the state of the art. Accordingly those features of novelty setting forth the nature and spirit of the invention are defined with particularity in the following claims.

I claim:

1. A modularized conveyor belt comprising in combination, a plurality of basic modular links, each having a stem with a generally hollow cylindrical portion defining a pivot rod journalling aperture therein with an axis normal to a first plane passing through the stem, with the stem being bifurcated into two extension branches each defining a generally hollow cylindrical portion with a pivot rod journalling aperture for receiving pivot rods with an axis offset parallel to that of a first pivot rod axis passing through the stem portion aperture so that planes passing through said extension branches are parallel to said first plane and lie on opposite sides of the first plane, said hollow cylindrical portions defining link driving teeth extending toward an inner surface of the belt, an assembly of side by side ones of said links forming a section of a conveyor belt with alternating stem portions extending in opposite directions in each of a plurality of end to end rows of the links disposed transversely across the belt from one belt edge to an opposite belt edge with the generally hollow cylindrical portions of adjacent end to end links disposed side by side, and a series of drive openings extending into the belt defined between links in two end to end rows for positioning external belt sprocket drive teeth to contact the link driving teeth on at least one of the two side by side cylindrical portions disposed on said pivot rod adjacent the drive openings thereby to comprise driving structure provided by the assembly for conveying the belt along a substantially linear pathway in response to an external driving force.

2. The conveyor belt of claim 1 further comprising support means integrally holding a plurality of the side-by-side links in place in a modular belt unit with the stems and extension branches forming interdigitating fingers extending in two opposite directions in a plane passing through the fingers and their pivot rod journalling apertures, said apertures of the module links being aligned along two respective adjacent parallel pivot pin receiving axes.

3. The conveyor belt of claim 1 further comprising, a rotatable drive sprocket having a plurality of drive teeth for entering said openings through the conveyor belt to contact said one cylindrical portion, a belt formed of said modular belt links articulated and held together by said pivot rods passing through the journalling apertures in the links, and said driving structure being located on said modular belt links for interacting with said drive sprocket teeth to move the conveyor belt in a driven path about said sprocket.

4. The conveyor belt of claim 3 wherein said link driving teeth on the modular belt links further comprise a sprocket engaging drive surface appendage extending away from each generally cylindrical portion and dimensioned to extend into a notch formed between adjacent sprocket teeth on said sprocket, said appendage being of a shape that presents a substantially planar drive surface mating with surfaces of said notch during movement into the notch and engagement of the appendage with said sprocket teeth.

5. The conveyor belt of claim 4 further comprising drive sprocket tooth structure defining said space between adjacent teeth by means of two generally planar drive surfaces on two adjacent sprocket teeth substantially radially disposed on the sprocket about an axis of sprocket rotation.

6. The conveyor belt of claim 5 wherein said link driving teeth further comprise trapezoidally positioned planar drive surfaces on said appendages for causing the appendage drive surfaces to enter and leave the space between the adjacent teeth on the sprocket wheel in a path assuring a substantially parallel relationship with the drive surfaces on the adjacent sprocket teeth and module teeth thereby to transmit drive forces avoiding any tendency to move the modular links in a direction away from the sprocket.

7. The conveyor belt of claim 1 wherein said link driving teeth further comprise appendages positioned on said modular links that extend outwardly from said cylindrical portions about the pivot pin journalling apertures in the modular links.

8. The conveyor belt of claim 1 wherein said generally hollow cylindrical portion defining the pivot rod journalling aperture further comprises generally cylindrical walls of differing thicknesses on opposite sides of the journalling aperture lying in a plane disposed parallel to the belt.

9. The conveyor belt of claim 1 further comprising a substantially longitudinal lateral link connecting beam integrally joining a plurality of said modular members into a modular section holding the modular members with pivot rod apertures in fixed alignment along two parallel pivot rod receiving axes.

10. The conveyor belt of claim 1 wherein said assembly of modular members forms a belt conveying surface terminating in a common load carrying planar surface.

11. Modular conveyor belt forming links integrally carrying drive tooth surfaces shaped with a generally trapezoidal appendage having planar drive surfaces and integrally extending from a generally cylindrical body forming a pivot rod journalling aperture for interacting with mating planar drive surfaces radially extending between adjacent teeth of a drive sprocket.

12. The modular conveyor belt forming links of claim 11 coupled together into a conveyor belt having a sprocket drive with mating drive surfaces for contacting said trapezoidal appendage.

13. The modular conveyor belt of claim 12 further comprising a rotatable drive sprocket having radially extending drive teeth forming notches between adjacent teeth for receiving the trapezoidal appendages of said belt forming members thereinto in driving relationship.

14. The conveyor belt of claim 13 in driving relationship with the driving sprocket with the trapezoidal appendages shaped for entry of the appendages into and exit from the sprocket notches in a drive path relationship that substantially avoids forces pushing the belt away from the sprocket.

15. The modular belt forming members of claim 11 wherein said generally cylindrical body has cylindrical sidewalls of differing thicknesses on opposite sides of the journalling aperture in a plane parallel to the belt.

16. A modular conveyor belt driven by a drive sprocket rotating about an axis of rotation and having radially extending drive teeth forming drive channels between adjacent teeth with drive surfaces extending substantially radially from the sprocket axis, belt forming modular sections forming drive appendages extending substantially from pivot rod journalling aperture forming cylindrical body walls with leading and trailing edge planar surfaces disposed to enter and leave the sprocket drive channels in substantially parallel relationship with the drive channel drive surfaces in a path avoiding any driving forces tending to push the belt away from the sprocket.

17. Modular links having disposed over a predetermined belt width along an axis perpendicular to belt travel a plurality of link ends extending from the links in opposite directions of belt travel for interdigitating with similar links to form a multiple row conveyor belt for articulating about pivot rods disposed through journalling apertures in the link ends, comprising in combination, modular links forming at least two said link ends, means holding the module links in side by side positions along said belt width with link ends of side-by-side modular links offset in adjacent rows, and structure in each of the link ends circumferentially surrounding the journalling apertures forming sprocket engaging teeth extending from one side of a belt formed by the modular links to define drive surfaces for mating with sprocket wheel drive surfaces.

18. Modular links as defined in claim 17 having said teeth in engagement with a rotatable sprocket wheel presenting the driving surfaces of the modular links in interacting drive engagement with mating sprocket driving surfaces on either side of the modular link sprocket engaging teeth to import tangential drive forces and to avoid forces tending to drive the modular links radially outward from the sprocket are avoided.

19. A modular link belt having end to end modular links arranged on a pivot rod with side by side pairs of substantially cylindrical link ends forming drive surfaces comprising teeth directed away from the belt respectively disposed for driving the belt in opposite directions, and sprocket drive means disposed for engaging said teeth on different ones of the pair of side by side link ends in a belt driving relationship in said opposite directions during dynamic articulation movement of the end to end links about the pivot rod.

20. The belt of claim 19 with a plurality of wishbone shaped links disposed on the pivot rod side by side in belt rows.

21. The belt of claim 19 with a plurality of v-shaped links disposed on the pivot rod side by side in belt rows.

22. The belt of claim 19 with a plurality of links having two said link ends disposed on the pivot rod side by side in belt rows.

23. The belt defined in claim 1 wherein the modular links are generally wishbone shaped.

24. The belt defined in claim 1 wherein the modular links are generally v-shaped.

25. The belt defined in claim 8 with cylindrical walls of greater thickness disposed adjacent said drive openings whereby only one of said one of the two side by side cylindrical portions engage the sprocket drive teeth.

* * * * *